(12) United States Patent
Brazier (10) Patent No.: US 12,371,114 B2
(45) Date of Patent: Jul. 29, 2025

(54) ANTI-JAM TRACK WHEEL ASSEMBLY

(71) Applicant: Glen Brazier, Karlstad, MN (US)

(72) Inventor: Glen Brazier, Karlstad, MN (US)

(*) Notice: Subject to any disclaimer, the term of this patent is extended or adjusted under 35 U.S.C. 154(b) by 800 days.

(21) Appl. No.: 17/300,058

(22) Filed: Feb. 25, 2021

(65) Prior Publication Data
US 2022/0266929 A1   Aug. 25, 2022

(51) Int. Cl.
| B62D 55/084 | (2006.01) |
| B62D 55/10 | (2006.01) |
| B62D 55/14 | (2006.01) |
| B62D 55/24 | (2006.01) |

(52) U.S. Cl.
CPC .......... *B62D 55/084* (2013.01); *B62D 55/10* (2013.01); *B62D 55/14* (2013.01); *B62D 55/24* (2013.01)

(58) Field of Classification Search
CPC ...... B62D 55/04; B62D 55/084; B62D 55/10; B62D 55/14; B62D 55/24
See application file for complete search history.

(56) References Cited

U.S. PATENT DOCUMENTS

| 3,823,790 | A | * | 7/1974 | Richison | A61G 5/066 |
| | | | | | 180/6.7 |
| 5,240,084 | A | * | 8/1993 | Christianson | B62D 55/02 |
| | | | | | 180/9.1 |
| 5,343,960 | A | * | 9/1994 | Gilbert | E02F 9/02 |
| | | | | | 180/9.26 |
| 6,062,661 | A | * | 5/2000 | Juncker | B62D 49/0635 |
| | | | | | 305/195 |
| 6,615,939 | B1 | * | 9/2003 | Karales | B62D 55/04 |
| | | | | | 180/9.26 |
| 7,328,760 | B2 | * | 2/2008 | Inaoka | B62D 55/15 |
| | | | | | 180/9.42 |
| 7,575,075 | B2 | * | 8/2009 | Fairhead | B62D 1/02 |
| | | | | | 180/6.7 |
| 11,498,631 | B2 | * | 11/2022 | L'Herault | B62D 55/244 |

* cited by examiner

*Primary Examiner* — Jason R Bellinger
(74) *Attorney, Agent, or Firm* — D L Tschida (57) ABSTRACT

An endless track assembly that mounts to a vehicle drive linkage. The track assembly includes a belted track, drive sprocket and sets of longitudinally and laterally offset ramp/road and idler/road wheels mounted to parallel sets of vertically offset coplanar axles that support interior track surfaces. Axles mounted adjacent forwardmost and aftmost ramp/road wheels support "anti-jam" wheels that are longitudinally and vertically offset from the other axles at the framework to prevent a kinking of the track at the forwardmost and aftmost ends.

14 Claims, 6 Drawing Sheets

FIG. 5

ANTI-JAM TRACK WHEEL ASSEMBLY

BACKGROUND OF THE INVENTION

The present invention relates to tracked vehicles and, in particular, to a shape changing track assembly wherein the track framework, includes a number of "anti-jam" wheels mounted intermediate to and laterally and vertically offset from foremost and/or aftmost ramp/road wheels and lower lying idler/road wheels and positioned to prevent the track from kinking or over-rotating at leading and trailing ends upon encountering relatively abrupt obstacles (e.g., curbs or small diameter logs).

A wide variety of personal and commercial all terrain vehicles have been developed for travel over off-road terrain such as desert, tundra, river beds, sodden fields and other unfriendly surface conditions to vehicle travel including mud, sand, rocks, timber etc. These vehicles typically support at least one pair of track assemblies from a chassis mounted suspension. Some of the track assemblies permit conversion of wheeled vehicles to track vehicles.

Of the latter type of track assemblies, some also provide for pivoting idler/road wheel supports that follow changes in terrain contours and control and counter-act track flexion. U.S. Pat. Nos. 6,904,986; 7,131,508; 7,533,741; and 7,597,161 disclose track assemblies of the foregoing types.

The foregoing assemblies and others commonly support at the forwardmost and aftmost ends of the framework transversely offset ramp/road wheels. The fore and aft ramp/road wheels are the first or last to encounter obstructions lying on the traveled terrain. When encountering relatively large obstructions such as large rocks and logs (e.g., 8+ inches high), the drive lugs keep pushing the track and vehicle forward, the lugs grip the obstruction and the track climbs up and over the obstruction. The following idler/road wheels and track suspension rise and fall to conform the track to travel over the obstruction, before descending at the aft ramp/road wheels.

On occasion and for relatively smaller obstructions that align with the space between the ramp/road and idler/road wheels, the track can kink or become pinched and jam into the space between the wheels. The relatively severe bending induced in the track can over flex the track and reduce the wear life of the track. The present track suspension is designed to prevent and/or minimize any track "jam" condition.

SUMMARY OF THE INVENTION

It is a primary object of the invention to provide an all-terrain vehicle with an improved suspension at each supported track assembly.

It is further object of the invention to provide a track assembly wherein a track framework supports a plurality of wheels mounted in contact with interior surfaces of the track and wherein the idler/road wheels are suspended to pivot, rise and fall at the framework as terrain obstructions are encountered.

It is further object of the invention to provide a drive track assembly wherein a track support framework supports one or more "anti-jam" wheels in forward and/or aft spaces between the forwardmost and aftmost ramp/road and adjacent idler/road wheels to prevent severe track flexion conditions known as "jamming".

It is further object of the invention to elevate longitudinally offset forward and aft "anti-jam" wheels in the vertical space between the forwardmost and aftmost ramp/road and adjacent idler/road wheels to prevent severe track flexion.

It is further object of the invention to provide a drive track assembly wherein each road axle supports several laterally displaced idler/road wheels and the forwardmost and aftmost ramp axles each support a pair of laterally displaced ramp/road wheels and wherein the framework further supports fore and aft idled "anti-jam" wheels longitudinally, vertically and laterally offset from the forwardmost and aftmost ramp/road wheels and elevated above the idler axles and below the ramp axles supporting the forwardmost and aftmost ramp/road wheels to prevent kinking or over flexion of the track.

The present invention was developed to provide an improved track conversion assembly for a variety of vehicles accommodative of a smoother vehicle ride. A belted track of the assembly is supported in endless fashion about a drive sprocket and several sets of non-driven internal idler/road wheels. Each wheel is supported from an axle that laterally spans the framework and is mounted to pivot, rise and/or fall to accommodate encountered obstructions disposed about the traveled terrain.

The track framework particularly supports forwardmost and aftmost ramp/road wheels vertically elevated above a number of idler axles supporting parallel rows of idler/road wheels aligned along a common longitudinal plane parallel to a plane containing the ramp axles. A further set of anti-jam axles and "anti-jam" wheels are aligned along an intermediate parallel longitudinal plane. These "anti-jam" wheels are supported in the longitudinal space between the forwardmost and aftmost ramp/road wheels and align along an intermediate plane to planes containing the ramp axles and idler axles. Upon encountering obstructions (e.g., curbs and relatively small diameter logs or rocks) that previously might induce a kinking in the track, the anti jam wheels support and prevent the track from kinking and enable the track from climbing over the offending objects.

The foregoing objects, advantages and distinctions of the invention are obtained in alternative track assemblies disclosed and discussed below. Still other objects, advantages, distinctions, constructions and combinations of individual features of the invention will become more apparent from the following description with respect to the appended drawings. Similar components, assemblies and sub-assemblies are referred to in the various drawings with similar alphanumeric reference characters. The description to each feature and/or combination should therefore not be literally construed in limitation of the invention. Rather, the invention should be interpreted within the broad scope of the further appended claims.

BRIEF DESCRIPTION OF THE PREFERRED EMBODIMENT

Figure 1:
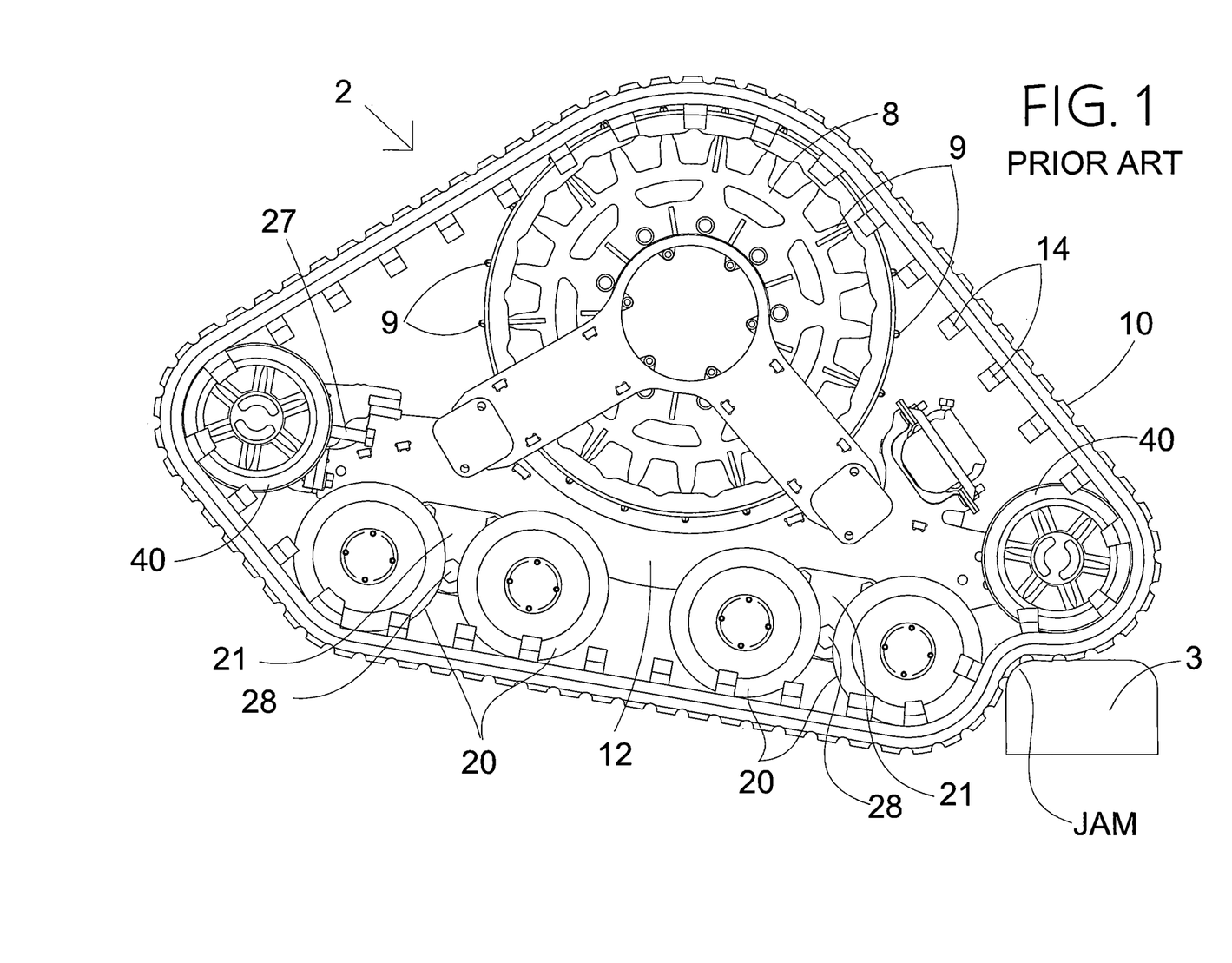
FIG. 1 is a perspective drawing showing a jammed track condition at a track assembly not outfitted with anti jam wheels and which problem is avoided with the improved track assembly of FIGS. 2-4.

Referring to FIG. 1, a track "jam" condition is shown at a track assembly 2 that is not outfitted with the improvements of the invention described herein that can lead to premature failure of a belted track 10 supported from a vehicle track assembly 2. Such a condition can occur upon climbing over a curb, rock or log 3 encountered by the track assembly 2. The kinking of the track 10 in the space between the forwardmost ramp/road wheels 40 and following idler/road wheels 20 can stress, abrade or tear the track belting. The improved "anti-jam" track assemblies 2 described herein relative to FIGS. 2-4 and FIGS. 5-6 are designed to avoid this problem.

Figure 2:
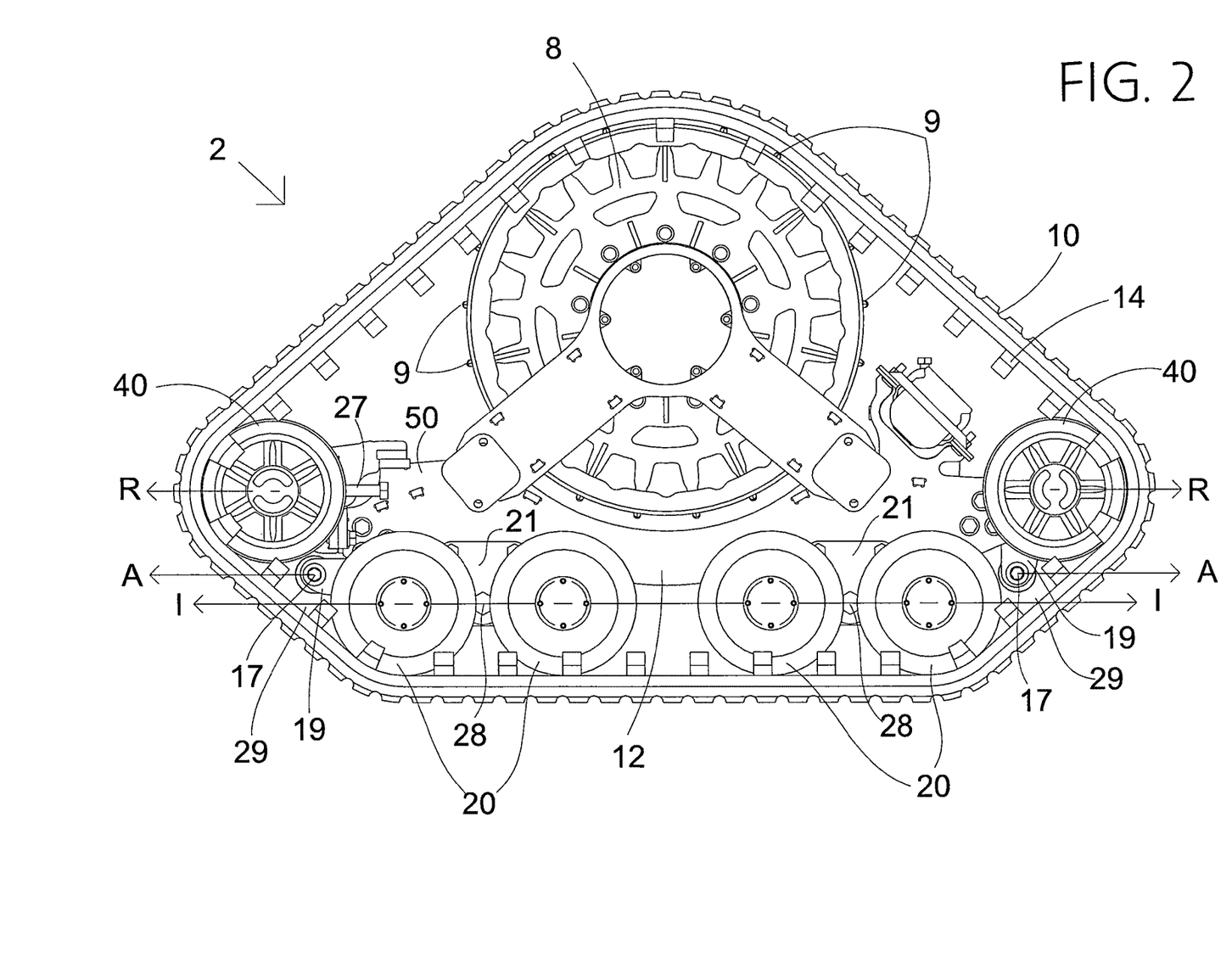
FIG. 2 shows a plan view of the "anti-jam" track assembly with a generalized track mounted to the framework and the relationship of reference planes containing the ramp, anti jam and idler axles.
Figure 3:
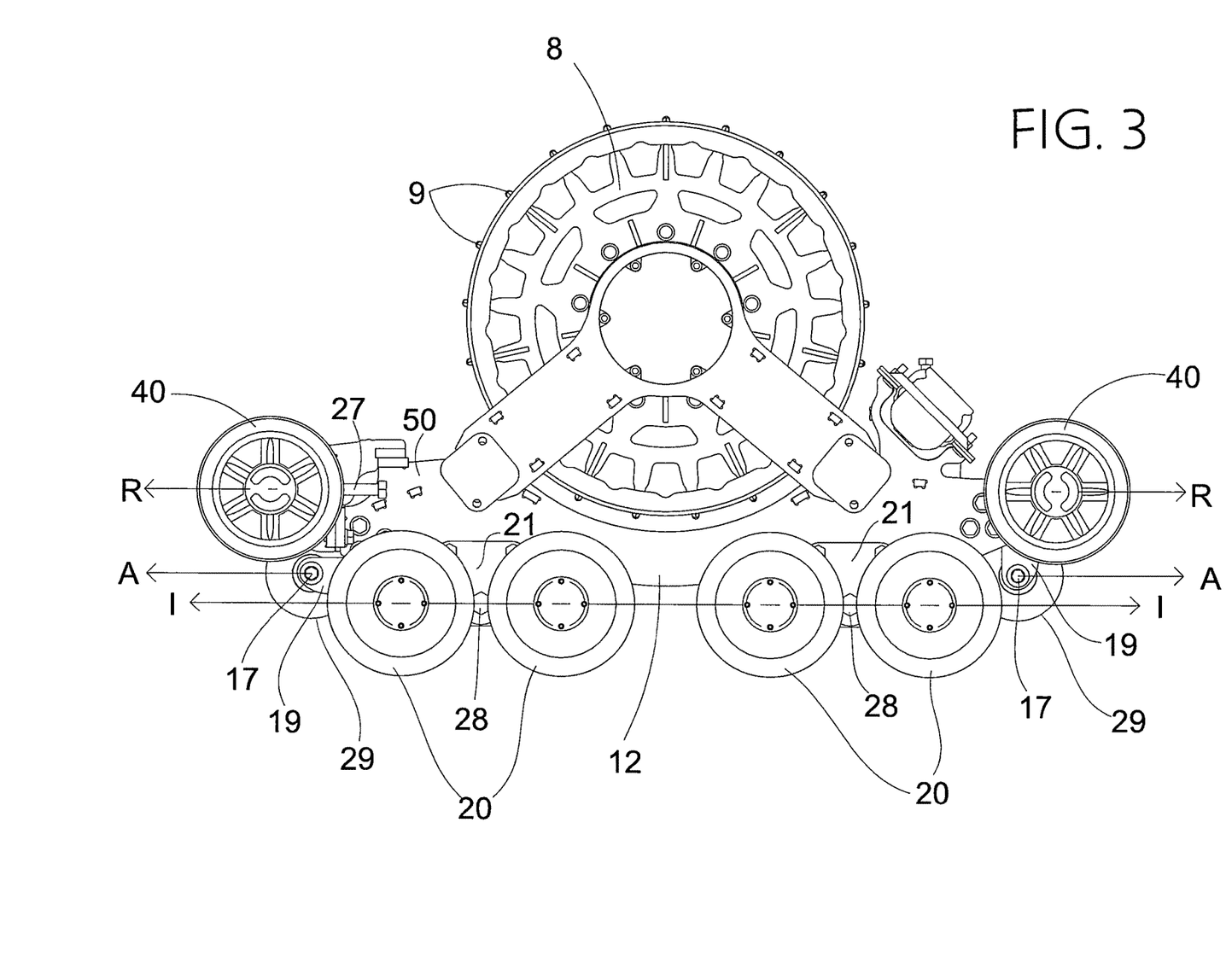
FIG. 3 shows a plan view of the "anti-jam" track assembly with the track removed and the relationship the reference planes containing the ramp, anti jam and idler axles.

With attention to FIGS. 2 and 3 a first "anti-jam" drive track assembly 2 is shown that includes an improved rocker-type track framework 12. The improved drive track assembly 2 is typically secured to an axle that extends from a supported vehicle (not shown). The axle can be powered or passive. The supported vehicle can be configured to any desired construction or configuration. The improved drive track assembly 2 can be combined with other drive track assemblies secured to the vehicle to appropriately distribute drive power, loading and accommodate steering.

The drive track assemblies 2 are designed to replace conventional wheels that are normally secured to vehicle axles. A pair of drive track assemblies 2 are thus typically actively powered via driven axles extending from a passenger compartmented vehicle and coupled to drive sprockets 8 at the track assemblies 2. In some circumstances and/or depending upon the vehicle or equipment type, the drive track assembly 2 can be mounted to passively rotate as the track assembly 2 distributes the vehicle's weight over uneven terrain.

The chassis (e.g., passenger, storage and cargo compartments) of the vehicle can be configured to any desired form and shape. Passenger, equipment supports or cargo storage platforms or compartments can be included and/or configured on vehicle support frame members as desired to accommodate any desired load, whether for personnel and/or cargo or equipment transport. An associated drive suspension (not shown) can be configured as desired with an appropriately sized engine and drive linkage(s) and/or axles coupled to the track assembly(s) 2.

The active and/or passive track assembly 2 can be mounted to steer or passively follow the supported vehicle. The track assembly 2 mounts to the vehicle via couplers and/or linkages that extend between the track assembly 2 and the vehicle axle and vehicle and track assembly frameworks. For a driven track assembly 2, drive power is supplied to each track assembly 2 via an appropriate drive linkage (not shown) coupled to the drive sprocket 8 at the track assembly 2. Drive power can be provided from a gas or diesel engine, suitable DC electric motors or combinations thereof.

The track assembly 2 includes the drive track 10 which is supported from the drive sprocket 8 and mounted to rotate about the framework 12. The framework 12 can be constructed of cast or metal plates that are cut, formed and/or welded to a preferred configuration. Whether or not actively powered, the drive sprocket 8 rotates to drive the track 10 as drive lugs, depressions or other suitable appendages or holes at the interior surface of the track 10 are contacted by suitable drive teeth 9 at the drive sprocket 8. The drive sprocket 8 is presently supported to couple to interior drive lugs 14 that project from and span an interior surface of the track 10.

Track tension is adjusted via a threaded adjustment linkage 27 coupled to extend and retract a forwardmost ramp axle 15 supporting a pair of ramp/road wheels 40. The ramp axle 15 is mounted to a moveable end section of the framework 12 that is manipulated with the adjustment linkage 27.

A series of longitudinally offset road axles 16 fitted to the track framework 12 transversely span the framework 12 above the terrain and support appropriate numbers of idler/roads wheels 20 in contact with interior surfaces of the track 10. Each road axle 16 supports multiple laterally offset idler/road wheels 20 that are aligned to engage interior longitudinal channels defined between laterally parallel rows of drive lugs 14 and some of which drive lugs 14 are engaged by the sprocket teeth 9.

Each road axle 16 extends through rocker plates 21 mounted to opposite sides 50 of the framework 12. Pivots 28 secure the rocker plates 21 to the framework 12 and allow the idler/road wheels 20 to pivot relative to the framework 12 as the idler/road wheels rotate in bearings mounted in axle bores at the center of each road/idler wheel 20.

Figure 4:
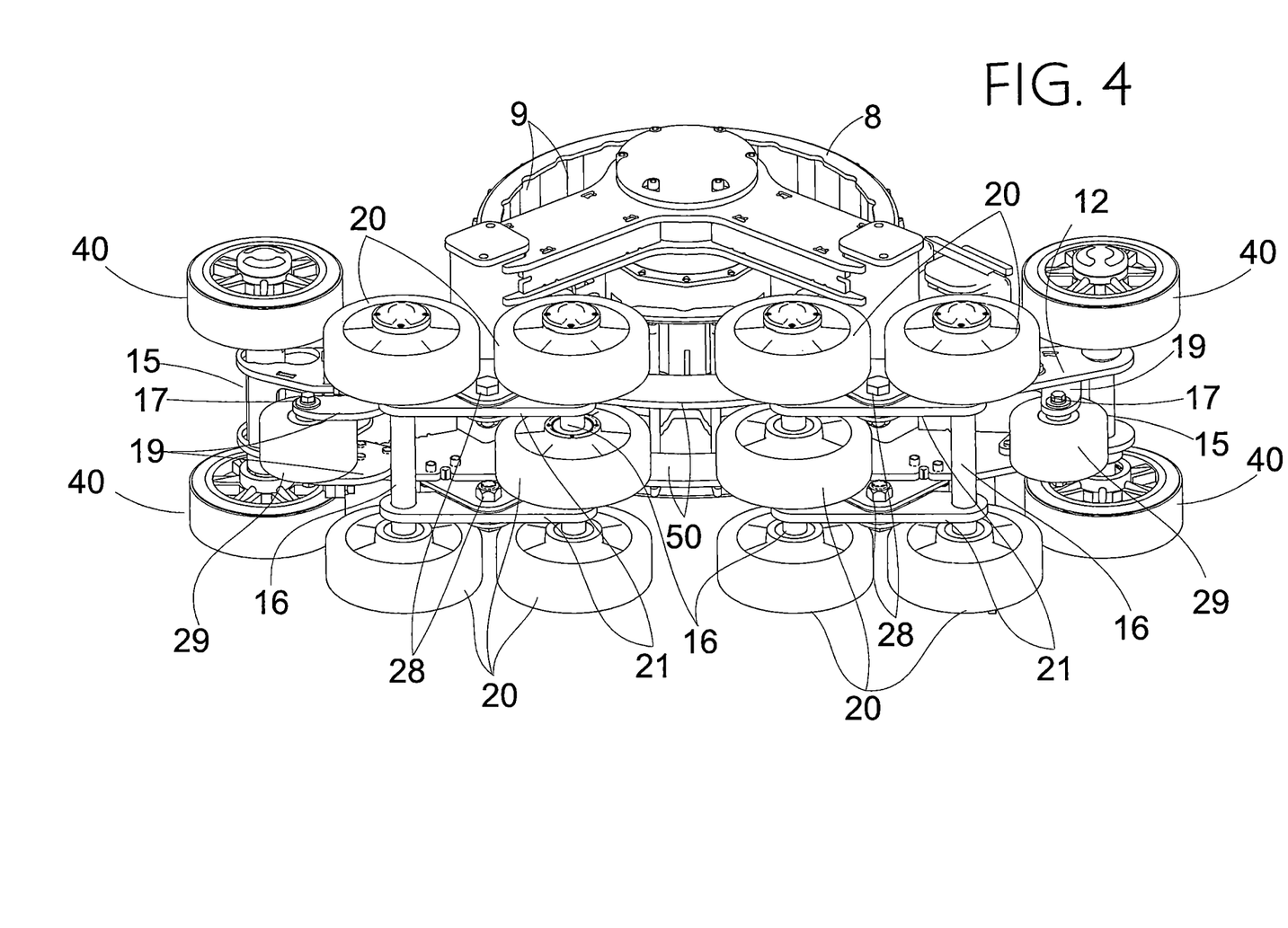
FIG. 4 is a perspective drawing showing the bottom of the "anti-jam" track framework with the track removed and particularly depicting the relative position and alignment of the anti jam wheels relative to the ramp/road and idler/road wheels.

With additional attention to FIG. 4, radiating from ramp axles 15 at the forwardmost and aftmost ends of the framework 12 and positioned above the road axles 16 are left and right pairs of the ramp/road wheels 40. The ramp/road wheels 40 are typically longitudinally aligned with the outermost and innermost idler/road wheels 20 of the adjacent set of idler/road wheels 20. The ramp/road wheels 40 also contact the interior surface of the track 10, typically in the same channel spaces as the adjacent outermost and innermost idler/road wheels 20.

The diameter of the fore and aft ramp/road wheels 40 and idler/road wheels 20 can be selected as desired to accommodate the specifications of the track assembly. Presently and for the depicted track assembly 2, the forward and aft ramp/road wheels 40 and the intermediate idler/road wheels 20 all exhibit a nominal diameter of 8-inches.

The framework 12 also supports a desired number of special purpose idler/road type of "anti-jam" wheels 29 from anti jam axles 17 mounted in seriatim and laterally intermediate the foremost and aftmost ramp/road wheels 40. The anti jam wheels 29 can best be seen at FIGS. 3 and 4. The anti jam wheels 29 exhibit a nominal diameter of 3 inches. The anti jam axles 17 are mounted to rigid links 19 that project from the framework 12. For some higher profile track assemblies, among other designs, the anti-jam axles 17 might be mounted to pivot from the framework 12 to better reduce track flexion.

Supported from each road axle 16 adjacent to the idler/anti-jam wheels 29 are a pair of laterally offset idler/road wheels 20. The idler/road wheels 20 are laterally and longitudinally aligned with the pairs of fore and aft ramp/road wheels 40. Other arrangements and positionings of idler/road wheels 20 can be provided. The present arrangement of two laterally offset idler/road wheels 20 centers the individual idler/anti-jam wheels 29 relative to the adjacent ramp/road wheels 40 and idler/road wheels 20.

Figure 5:
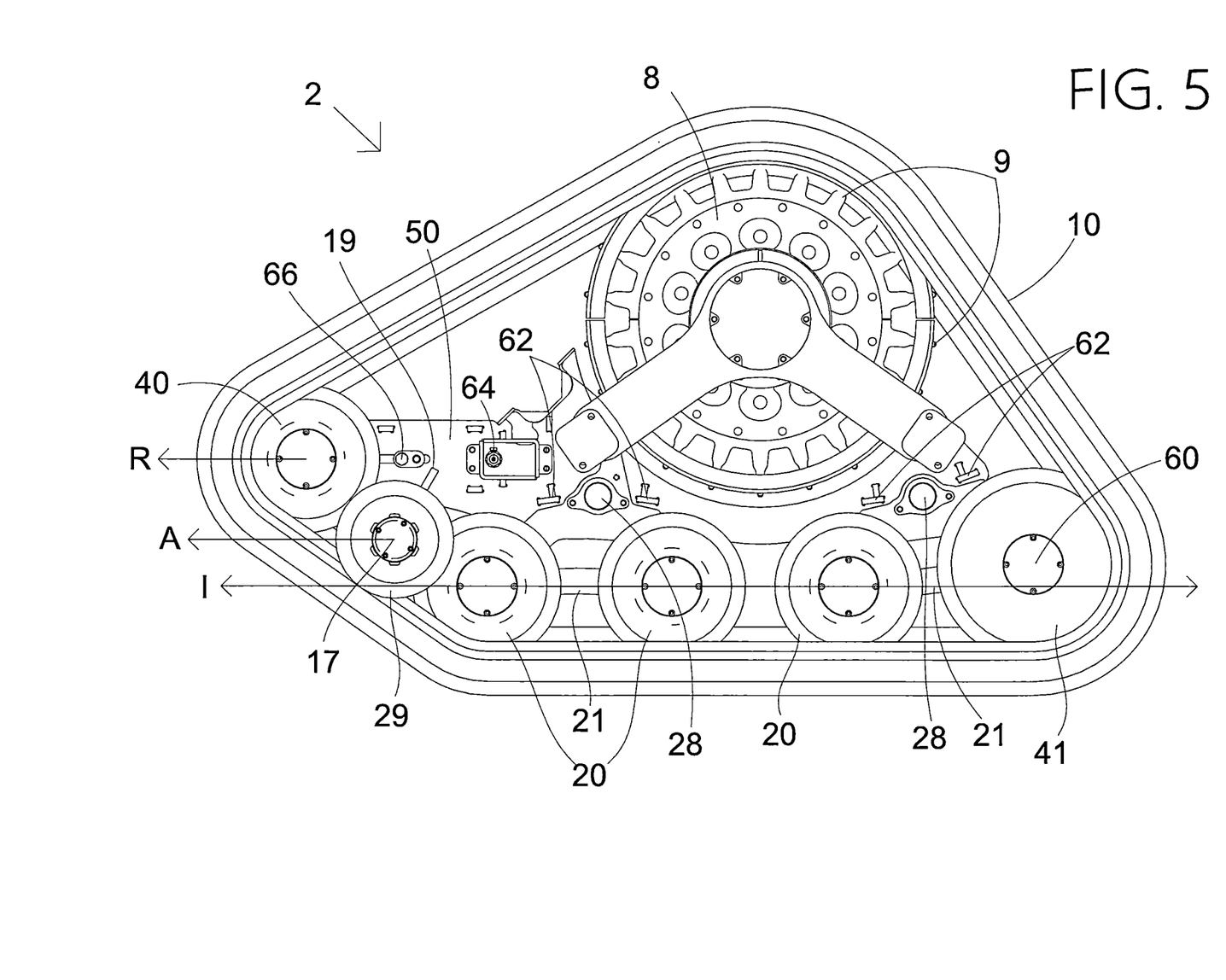
FIG. 5 shows a plan view of an alternative "anti-jam" track assembly similar to FIG. 2 but with a single set of forward anti jam wheels laterally displaced outside the width of the adjoining ramp and idler road wheels.
Figure 6:
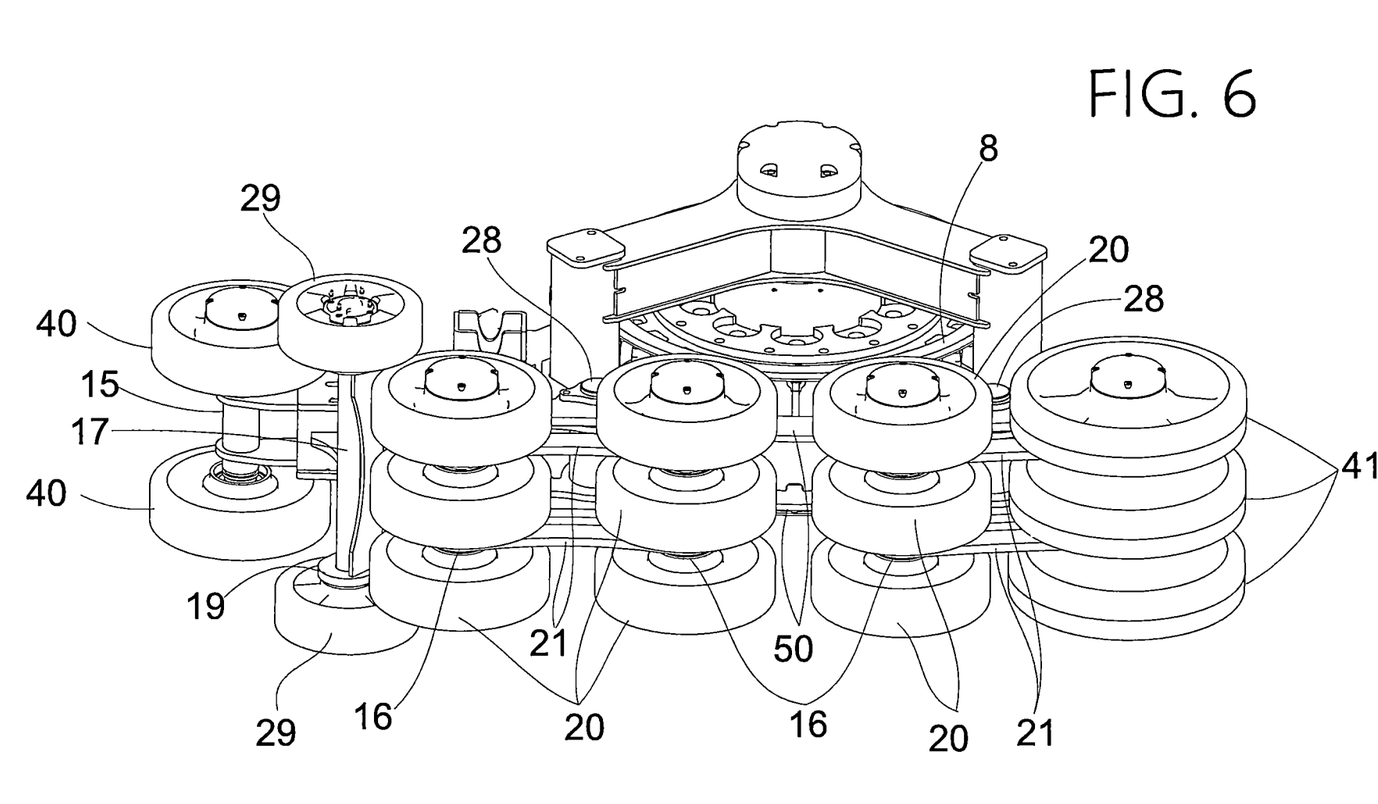
FIG. 6 is a perspective drawing showing the bottom of the "anti-jam" track assembly of FIG. 5 with the track removed and particularly depicting the lateral displacement of the forward anti jam wheels to contact the outside lateral edges of the track relative to the forward ramp/road and idler/road wheels and rocker mounting of hybrid aft ramp/idler wheels without aft anti jam wheels.

The intermediate road axles 16 support three laterally offset idler/road wheels 20 and the center ones of which are longitudinally aligned to the idler/anti-jam wheels 29. Although single idler/anti-jam wheels 29 are presently provided at the anti jam axles 17, other number and arrangements of anti-jam wheels 29 can be mounted to the anti jam axles 17. One example of multiple idler/anti-jam wheels mounted to an anti jam axle 17 is shown at FIGS. 5 and 6 and is discussed below.

The anti jam axles 17 are longitudinally offset between the adjacent ramp and road axles 15 and 16. The anti jam axles 17 are vertically positioned below the ramp axles 15 and above the road axles 16 as noted from the reference planes "R", "A" and "I" containing coplanar sets of ramp, road and anti jam axles 15, 16 and 17. Depending upon the diameter of the anti jam wheels 29, the height of the track assembly 2, among other considerations, the vertical offset can be varied of the anti jam axles 17 within the space between the reference planes R and I. The track assembly 2 of FIGS. 2-4 is designed to provide a low-profile track assembly 2.

Regardless of the track assembly configuration, any particular arrangement of anti jam wheels 29 is determined with the objective of preventing the track 10 from kinking in the fashion shown at FIG. 1. That is, the anti jam wheels 29 are positioned to interact with the track 10 only when the track 10 strikes an object that fits in the space between the fore and aft ramp wheels 40 and the adjoining idler/road wheels 20. In those instances, and with the track flexion, the special purpose anti jam wheels 29 engage the track 10 and limit and/or prevent track flexion and thereby enhance the life of the track 10 and ability of the supported vehicle to traverse obstruction strewn terrains.

With attention to the framework 12, the framework 12 is generally constructed as a box frame. The framework 12 comprises welded top, bottom and side plates 50 that are appropriately positioned to obtain desired support and strength. The road axles 16 are mounted to the rocker plates 21 that pivot from opposed side plates 50 of the framework 12. The rocker plates 21 are secured to pivot from pivot pins 28 affixed to the side plates 50. The pivot pins 28 are aligned with the plane "I" defined by the road axles 16. Stop limits project to control the range of rotation of the rocker plates 21 and idler/road wheels 20 relative to the framework 12. The anti jam axles 17 are supported to the rigid link plates 19 mounted to the side plates 50.

In normal circumstances and upon encountering objects 3 distributed about the terrain, the ramp/road wheels 40 induce the track 10 to grip the object 3 and lift the track assembly 2. If the track 10 flexes inward, the following anti jam wheel(s) 29 support and prevent the track 10 from kinking. The following idler/road wheels 20 in turn engage and conform the track 10 up and over the object 3. The successively following idler/road wheels 20 pivot as appropriate to continue to conform the track 10 to the object 3 as the track 10 passes over the object 3. If the aft end of the track 10 flexes inward, the rearmost anti jam wheels 29 engage the track 10 and again prevent the track from kinking. Lastly, as the following aft ramp/road wheels 40 encounter and pass over the object 3, the track assembly 2 is lowered to the terrain. The track 10 thus conformally passes over the object 3 without any undue kinking.

An alternatively configured track assembly 2 is depicted at FIGS. 5 and 6. This alternative track assembly provides a different mounting arrangement of anti jam wheels 29. For this construction of the track assembly 2, a single forward anti jam axle 17 is provided. A pair of laterally displaced anti jam wheels 29 are mounted to the anti-jam axle 17 and align with the outer edges of the track 10 outbound of the adjacent forwardmost ramp and idler/road wheels 40 and 20. The idler/anti-jam wheels 29 exhibit a nominal diameter of 8 inches and the forward ramp and idler/road wheels 40 and 20 exhibit nominal diameters of 10 inches.

The anti jam axle 17 is, as before, longitudinally offset between the adjacent forward ramp and idler road axles 15 and 16. The anti jam axle 17 is vertically positioned below the forward ramp axle 15 and above the axis of the road axles 16 as noted from the reference planes "R", "A" and "I" containing the ramp, road and anti-jam axles 15, 16 and 17.

In lieu of mounting an anti jamb axle 17 to the aftmost end of the framework 12, three ramp/road wheels 41 are fitted to an aft ramp axle 60 mounted beneath the depicted outer bearing covers. The ramp axle 60 laterally spans the framework 12 and supports three enlarged, laterally and evenly displaced ramp/road wheels 41. The ramp/road wheels 41 exhibit a nominal diameter on the order of 13 inches.

The ramp/road wheels 41 are mounted to the aft rocker plates 21. The aft rocker plates 21 pivot about the aft pivot pins 28. The fore and aft pivot pins 28 are elevated on the framework 12 and lie between the reference planes "R" and "A" versus the pivot pins 28 at the track assembly of FIGS. 1-4. Stop/limits 62 are located to the sides of the pivot pins 28 to limit the pivoting motion of the rocker plates 21 to approximately 5 degrees of rotation. The aft end of the aft rocker plates 21 are also angled slightly upward to accommodate the vertical differential of the larger diameter aftmost idler/road wheels 20.

The enlarged ramp/road wheels 41 thus essentially present a hybrid anti jamb wheel arrangement. That is, the aftmost ramp/road wheels 40 and one set of idler/road wheels 20 have been re-configured in the form of three enlarged idler/ramp wheels 41. The idler/ramp wheels 41 have also been mounted to pivot relative to the framework 12. The aft end of the track 10 upon traversing and descending from an object is thereby supported kink-free by the pivoting action of the enlarged aft idler/ramp wheels 41.

Kinking is as before prevented at the forward end of the track 10 of this alternative track assembly 2 by the pair of forward anti jamb wheels 29. The anti-jam wheels 29 in contrast are mounted to engage the track 10 with normal track rotation. Track flexion is thus prevented as the track 10 passes over an obstruction. It is to be appreciated a variety of other configurations of track assemblies can be constructed that include anti jam wheels 29 arranged to accommodate particular terrains with different numbers and positionings of the anti jam wheels 29 relative to included ramp/road wheels 40 and/or 41 and idler/road wheels 20.

Another distinguishing modification to the track assembly 2 of FIGS. 5 and 6 is the addition of a hydraulic track tensioner linkage 64 used to establish proper tension at the track 10. The tensioner 64 operates a hydraulic piston mounted at the framework 12 to extend and retract the piston and forward, moveable end section of the framework 12. Upon establishing an appropriate track tension, the tension is maintained with fasteners 66 that secure the framework sections together.

While the invention is shown and described with respect to a presently considered track assembly and several considered improvements, modifications and/or alternatives thereto, still other assemblies and arrangements may be suggested to those skilled in the art. It is to be appreciated also that the features of the foregoing vehicles and track assemblies can be arranged in different combinations. The foregoing description should therefore be construed to include all those embodiments within the spirit and scope of the following claims.

What is claimed is:

1. A track assembly comprising:
   a) a track having an interior surface from which a plurality of drive lugs project and an exterior surface from which a plurality of ground lugs project and including a surface region defining a footprint whereat the ground lugs engage the terrain; and
   b) a framework including a drive sprocket, a plurality of ramp wheels supported from a plurality of ramp axles at a forwardmost and an aftmost end of the framework, a plurality of idler wheels supported intermediate the ramp axles from a plurality of road axles at the framework, wherein the ramp axles are elevated above the road axles and wherein said track is circumferentially trained around said framework such that the drive lugs engage said sprocket and said ramp and idler wheels contact the interior surface of said track; and
   c) wherein first and second anti-jam axles are respectively longitudinally mounted to laterally span said framework between a forward ramp axle and an adjacent forwardmost road axle and between an aft ramp axle and an adjacent rearmost road axle and are vertically offset below the ramp axles and above the road axles, and wherein at least one anti-jam wheel is mounted to each anti-jam axle to support the track as the forwardmost and aftmost ramp and road wheels pass over terrain born obstructions to prevent the track from kinking inward.

2. A track assembly as set forth in claim 1 wherein the ramp axles and the road axles laterally span the framework, wherein at least two idler wheels are laterally displaced along each of the road axles, wherein at least two ramp wheels are laterally displaced along each of the ramp axles, and wherein at least two anti-jam wheels are mounted to each of the anti-jam axles.

3. A track assembly as set forth in claim 1 wherein the road axles are mounted to rocker plates mounted to pivot relative to said framework.

4. A track assembly as set forth in claim 1 wherein the anti-jam axles are mounted to link plates affixed to said framework intermediate the forwardmost and aftmost ones of said ramp and road axles.

5. A track assembly as set forth in claim 1 wherein the ramp axles are mounted coplanar to each other, wherein the road axles are mounted coplanar to each other, wherein the anti-jam axles are mounted coplanar to each other, and wherein the planes containing said ramp, anti-jam and road axles lie parallel to each other.

6. A track assembly as set forth in claim 5 wherein a pair of anti-jam wheels are mounted to each anti-jam axle and wherein the anti-jam wheels are laterally displaced outward of said plurality of ramp and idler wheels and mounted to contact outer edges of said track.

7. A track assembly comprising:
   a) a track having an interior surface from which a plurality of drive lugs project and an exterior surface from which a plurality of ground lugs project and including a surface region defining a footprint whereat the track ground lugs engage the terrain; and
   b) a framework including a drive sprocket, a plurality of ramp wheels supported from a plurality of ramp axles laterally spanning a forwardmost and an aftmost end of the framework, a plurality of idler wheels supported from a plurality of road axles mounted to a plurality of rocker plates longitudinally extending parallel to the framework, wherein said rocker plates and road axles are coupled to pivot from the framework to maintain contact between the idler wheels and the interior surface, wherein the ramp axles are elevated above the road axles, and wherein said track is circumferentially trained around said framework such that the drive lugs engage said sprocket and said ramp and road wheels contact the interior surface of said track; and
   c) wherein first and second anti-jam axles are respectively longitudinally mounted to the framework between a forward ramp axle and an adjacent forwardmost road axle and an aft ramp axle and an adjacent rearmost road axle and are vertically offset below the ramp axles and above the road axles and wherein the anti-jam axles each support at least one anti-jam wheel mounted to support the track as the idler wheels pivot upon passing over terrain born obstructions to prevent the track from kinking inward as the track travels over encountered obstructions.

8. A track assembly as set forth in claim 7 wherein at least two idler wheels are laterally displaced along each of the road axles, wherein at least two ramp wheels are laterally displaced along each of the ramp axles, and wherein at least two anti-jam wheels are mounted to each of the anti-jam axles.

9. A track assembly as set forth in claim 7 wherein the ramp axles are mounted coplanar to each other, wherein the road axles are mounted coplanar to each other, wherein the anti-jam axles are mounted coplanar to each other, and wherein the planes containing said ramp, anti-jam and road axles lie parallel to each other.

10. A track assembly as set forth in claim 9 wherein at least two idler wheels are mounted to each anti-jam axle and wherein the anti-jam axles are mounted to link plates affixed to said framework.

11. A track assembly as set forth in claim 10 wherein the anti-jam wheels are laterally displaced outward of said plurality of ramp wheels and idler wheels and mounted to contact outer edges of said track.

12. A track assembly comprising:
   a) a track having an interior surface from which a plurality of drive lugs project and an exterior surface from which a plurality of ground lugs project and including a surface region defining a footprint whereat the ground lugs engage the terrain; and
   b) a framework including a drive sprocket, a plurality of ramp wheels supported from forward and aft ramp axles at a forwardmost and an aftmost end of the framework, a plurality of idler wheels supported intermediate the forward and rear ramp axles from a plurality of road axles, wherein the road axles and aft ramp axle are mounted to pivot relative to said framework, and wherein the ramp axles are elevated above the road axles; and
   c) wherein a forward anti-jam axle laterally spans said framework intermediate the forward ramp axle and a forwardmost road axle, wherein the forward anti-jam axle supports at least one anti-jam wheel, wherein the road axles are mounted in a plane coplanar with each other, wherein the forward anti-jam axle is mounted above the plane of the road axles, and wherein the ramp, idler and anti-jam wheels maintain contact with the interior surface and prevent the track from kinking as the track flexes upon passing over terrain born obstructions.

13. A track assembly as set forth in claim 12 wherein at least two anti-jam wheels are mounted to the forward anti-jam axle and wherein the anti-jam wheels are laterally displaced outward of said plurality of ramp wheels and idler wheels and wherein the anti-jam wheels are mounted to contact outer edges of said track.

14. A track assembly as set forth in claim 13 wherein the road axles and aft ramp axle are mounted to link plates affixed to said framework to pivot said idler wheels and aft ramp wheels relative to said framework.

* * * * *